United States Patent [19]

Koopman

[11] 4,225,149
[45] Sep. 30, 1980

[54] REMOTELY OPERABLE TRAILER HITCH

[76] Inventor: Robert J. Koopman, Rte. #1, Auburndale, Wis. 54412

[21] Appl. No.: 24,796

[22] Filed: Mar. 28, 1979

[51] Int. Cl.³ ............................................. B60D 1/14
[52] U.S. Cl. .................................... 280/477; 280/508
[58] Field of Search ............... 280/477, 478 B, 478 R, 280/508, 510

[56] References Cited

U.S. PATENT DOCUMENTS

| 827,431 | 7/1906 | Eversen | 280/477 |
|---|---|---|---|
| 2,441,285 | 5/1948 | Pfeiffer | 280/477 |
| 2,478,591 | 8/1949 | Miller | 280/477 |
| 2,804,315 | 8/1957 | Guye | 280/477 |
| 2,844,390 | 7/1958 | Smith | 280/477 |
| 3,891,237 | 6/1975 | Allen | 280/477 |
| 3,912,302 | 10/1975 | Patterson | 280/477 |
| 4,073,507 | 2/1978 | Dingess | 280/477 |

*Primary Examiner*—John J. Love
*Assistant Examiner*—Donn McGiehan
*Attorney, Agent, or Firm*—Clarence A. O'Brien; Harvey B. Jacobson

[57] ABSTRACT

A forwardly projecting hitch pole including a coupling member on its free forward end and a rearwardly opening receiver for the coupling member and for mounting on a towing vehicle. The coupling member includes a horizontal forwardly bowed arcuate hitch portion generally cylindrical in cross section and the receiver defines a rearwardly opening horizontally transversely elongated recess in which to receive the hitch portion. The forward portion of the recess defines a horizontal generally arcuate seat curving rearwardly at its opposite ends. A vertically swingable latch is oscillatably supported from the receiver and includes a rear forwardly opening hook portion and the latch is angularly displaceable relative to the receiver between an operative position with the hook portion horizontally registered with the central rear portion of the recess and an inoperative position with the hook portion vertically displaced out of horizontal registry with the recess. The hook portion, when in the operative position and when the hitch portion is seated against the seat, is disposed immediately rearwardly of the hitch portion and prevents its rearward displacement from the recess. Also, the latch is supported from the receiver for limited shifting in the direction in which the hook opens and the latch and receiver include coacting abutment structure engageable with each other to prevent displacement of the latch from the operative position to the inoperative position when the latch is in its rearward limit position.

9 Claims, 4 Drawing Figures

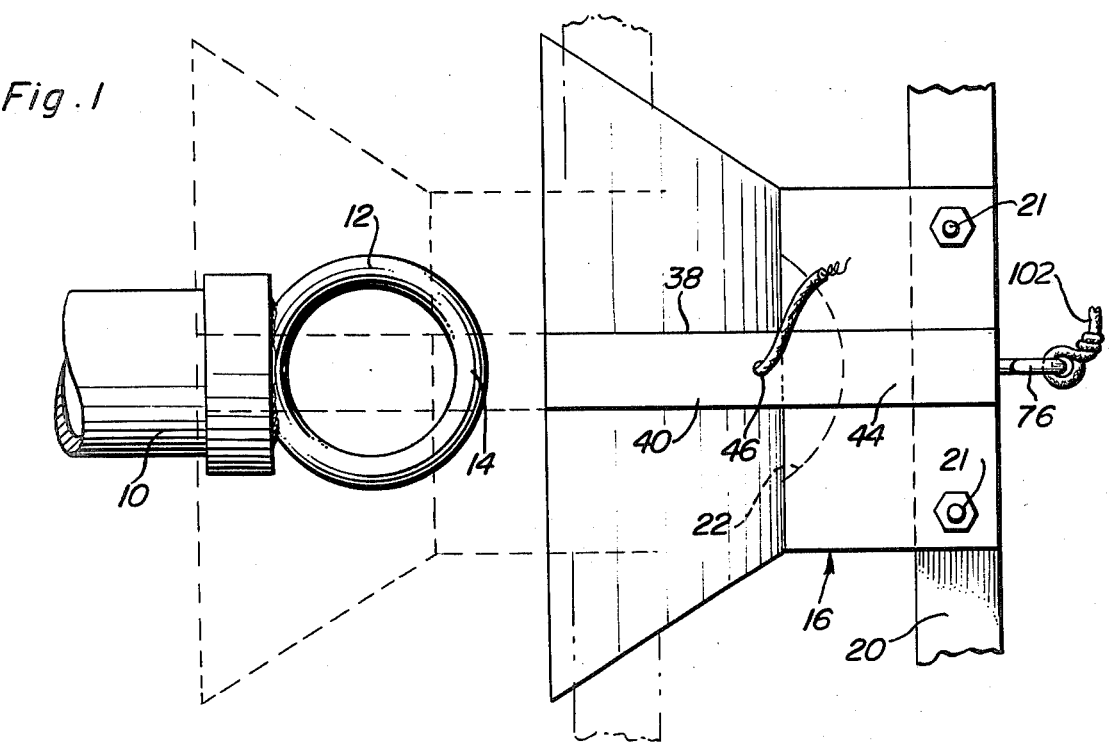
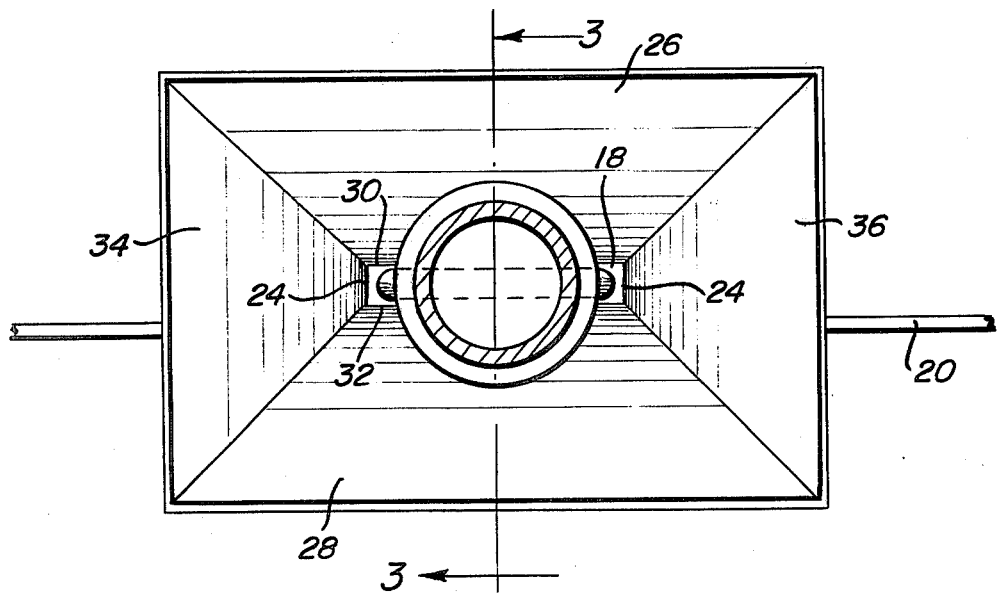

REMOTELY OPERABLE TRAILER HITCH

BACKGROUND OF THE INVENTION

Various forms of hitch pole coupling structures have been heretofore designed and many of these are constructed in a manner whereby they may be automatically engaged and readily remotely disengaged. Examples of various forms of hitch pole coupling structures are disclosed in U.S. Pat. Nos. 827,431, 2,478,591, 2,804,315, 2,844,390, 3,891,237, 3,912,302 and 4,073,507. However, most of these hitch pole coupling structures are complex in nature and thus reasonably expensive to produce. Further, some are constructed in a manner whereby they are difficult to operate and do not enjoy occasional fully functional operation over extended periods of time and require more than minimal maintenance to be maintained in fully functional condition.

BRIEF DESCRIPTION OF THE INVENTION

The hitch pole coupling structure of the instant invention is constructed in a manner whereby it may be used with confidence regularly or occasionally over extended periods of time and with the elements having little adverse effect on the functional operation thereof.

The main object of this invention is to provide a hitch pole latch construction which may be utilized in conjunction with substantially any vehicle provided with a hitch pole for towing and a towing vehicle upon which a receiver construction may be mounted.

Another object of this invention is to provide a hitch pole latch construction which will be capable of withstanding considerable towing stresses.

Yet another object of this invention is to provide a hitch pole latch construction including a single latching hook thereof which may be readily shifted into and out of operative position through the utilization of various forms of latching hook displacement structure.

A final object of this invention to be specifically enumerated herein is to provide a hitch pole latch structure in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary top plan view of the forward end of a conventional form of hitch pole and a towing vehicle mounted receiver incorporating the hitch construction of the instant invention;

FIG. 2 is a rear elevational view of the assemblage illustrated in FIG. 1, but with the hitch pole in fully latched relation relative to the receivers;

DETAILED DESCRIPTION OF THE INVENTION

Figure 3:
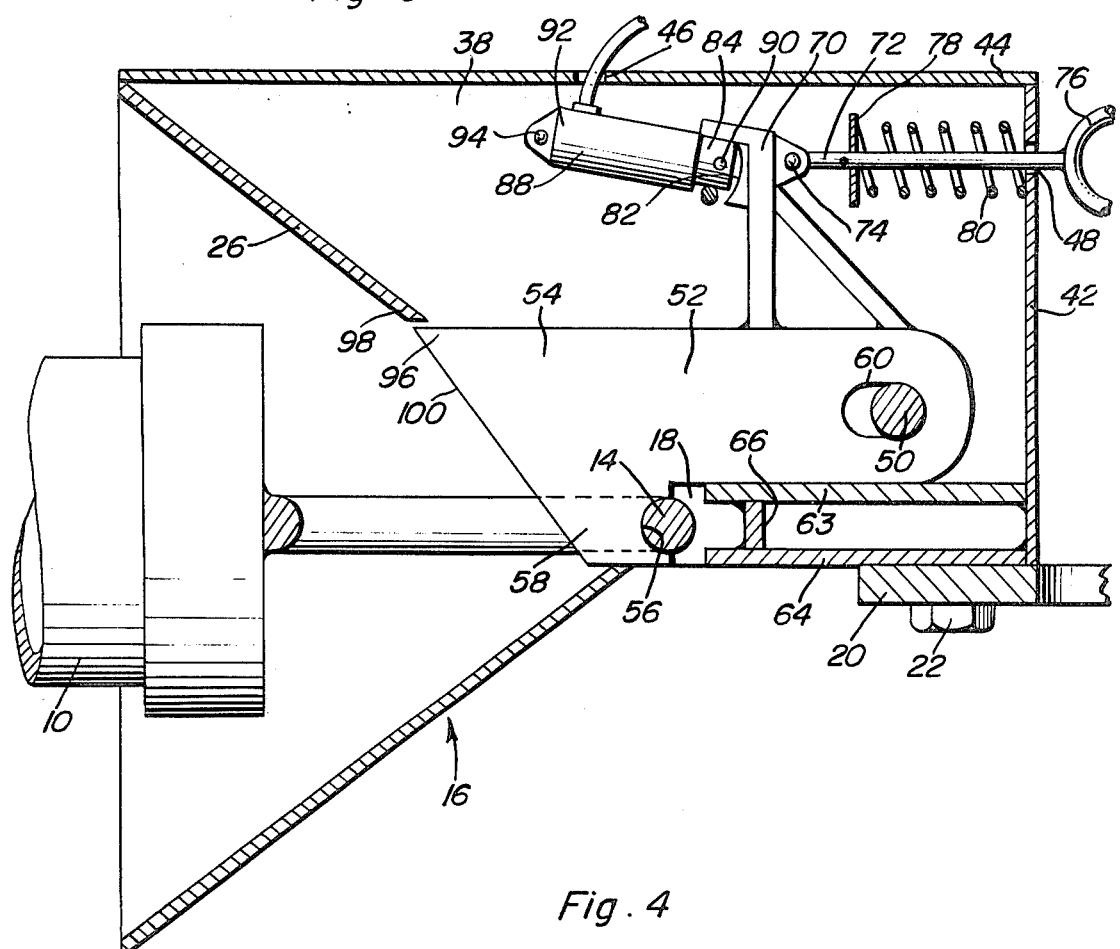
FIG. 3 is an enlarged fragmentary transverse vertical sectional view taken substantially upon the plane indicated by the section line 3—3 of FIG. 2.

Referring now more specifically to the drawings, the numeral 10 designates a conventional form of trailer hitch pole having a horizontal towing ring 12 mounted on its forward end. The forward portion of the towing ring 12 defines an arcuate forwardly bowed hitch portion 14 which is generally cylindrical in cross section. The numeral 16 generally designates a receiver defining a horizontally transversely elongated and rearwardly opening recess 18 and mounted on a towing vehicle 20 in any convenient manner such as by mounting bolts 21.

The recess 18 opens rearwardly and its forward extremity is defined by a seat structure 22 which is horizontally elongated and arcuate in horizontal plan shape. The seat structure 22 opens rearwardly and curves rearwardly at its opposite ends toward the ends 24 of the recess 18.

The receiver 16 includes upper and lower forwardly convergent guide plates 26 and 28 which terminate at their lower and upper forward ends, respectively, at the upper and lower marginal portions 30 and 32 of the recess 18. Also, the receiver 16 includes opposite side forwardly convergent guide plates 34 and 36 extending between the plates 26 and 28 and which terminate forwardly at the opposite ends 24 of the recess 18. The plates 26, 28, 34 and 36 define guides for guiding the ring 12 into the recess 18 from a position displaced rearwardly thereof.

The receiver 16 includes a pair of laterally spaced front-to-rear extending central plates 38 and 40 which extend forwardly from the rear surface of the plate 26 and the forward ends of the plates 38 and 40 are bridged by a forward upstanding plate 42. Also, the upper marginal edges of the plates 38 and 40 are interconnected by a top plate 44 secured and extending therebetween and also joined to the upper marginal portion of the plate 42. The plate 44 includes an opening 46 formed therethrough for a purpose to be hereinafter more fully set forth and the plate 42 includes an opening 48 formed therethrough for a purpose which will also hereinafter be more fully set forth.

A pivot pin 50 extends and is secured between the lower forward portions of the plates 38 and 40 and the forwardly projecting long leg 52 of a J-shaped latch 54 defining a forwardly opening hook 56 on its short leg 58 includes a longitudinal slot 60 through which the pivot pin 50 is slidably and rotatably received. The plate 26 has a central downwardly opening notch 62 formed in its lower marginal edge portion and in which the rear portion or short leg 58 of the latch 54 is receivable. The seat structure 22 is defined by forward upper and lower plates 63 and 64 rigidly relatively braced adjacent their forward ends by means of a vertical brace 66 extending and secured therebetween. The long leg 52 of the latch 54 overlies and abuts the upper surface of the plate 63 when the latch 54 is in its operative position and the latch 54 includes an upstanding lever arm 70 to whose upper portion the rear end of a pull rod 72 is pivotally attached as at 74, the forward end of the pull rod 72 being slidably received through the opening 48 in the plate 42 and provided with a pull ring 76. The pull rod 72 has an abutment 78 thereon rearward of the plate 42 and a compression spring 80 is disposed about the rod 72 between the abutment 78 and the rear surface of the plate 42 and thereby serves to yieldingly bias the pull rod 72 rearwardly through the opening 48.

The rear side of the upper portion of the lever 70 defines a rearwardly opening seat 82 and the extendible and retractable piston portion 84 of a hydraulic cylinder 88 is pivotally anchored within the seat 82 as at 90 with the cylinder portion 92 of the hydraulic cylinder 88 pivotally mounted between the plates 38 and 40 as at 94.

It may be seen from FIG. 3 of the drawings that when the latch 54 is in its lowermost position with the pivot pin 50 seated in the forward end of the slot 60, the rear extremity 96 of the long leg 52 of the lever 54 underlies the lower marginal portion 98 of the plate 26 and thereby prevents upward swinging movement of the rear end of the latch 54 and thus swinging movement of the hook 56 out of registry with the recess 18. The lever 54 is spring biased toward the operative limit position thereof illustrated in FIG. 3 by the spring 80. Further, when the ring 12 is seated in the recess 18 against the seat structure 22, the hitch portion 14 thereof is disposed forwardly of the hook 56 and thus retained within the recess 18.

When it is desired to release the hitch portion 14 from the recess 18, the hydraulic cylinder 88 (to which fluid under pressure is supplied through a pressure line extending through opening 46) is actuated in order to extend the piston rod portion 84 toward the upper end of the lever 70, and thus the latch 54, is shifted forwardly until the rear extremity 96 of the long leg 52 is shifted forwardly out of registry with the lower marginal portion 98 of the plate 26. Then, further extension of the piston rod portion 84 will swing the latch 54 toward the inoperative position thereof illustrated in FIG. 4, whereby the ring 12 may be rearwardly displaced from the recess 18. When the hydraulic cylinder 88 is deactivated, the spring 80 yieldingly biases the lever 54 downwardly toward a position with the upper portion of the cam surface 100 of the latch 54 engaged with the lower marginal portion 98 of the plate 26. Engagement of the cam surface 100 with the plate 26 will cam the latch 54 forwardly from a position with the pivot pin 50 seated in the forward end of the slot 60 to a position whereby the rearward extremity 96 of the long leg 52 may pass downwardly in front of the lower marginal portion 98 of the plate 26. After the latch 54 reaches its downward limit of swinging movement defined by the plate 63, the latch 54 is shifted rearwardly back to the position thereof illustrated in FIG. 3 of the drawings with the rearward extremity 96 disposed beneath the lower marginal portion 98 if the plate 26.

Figure 4:
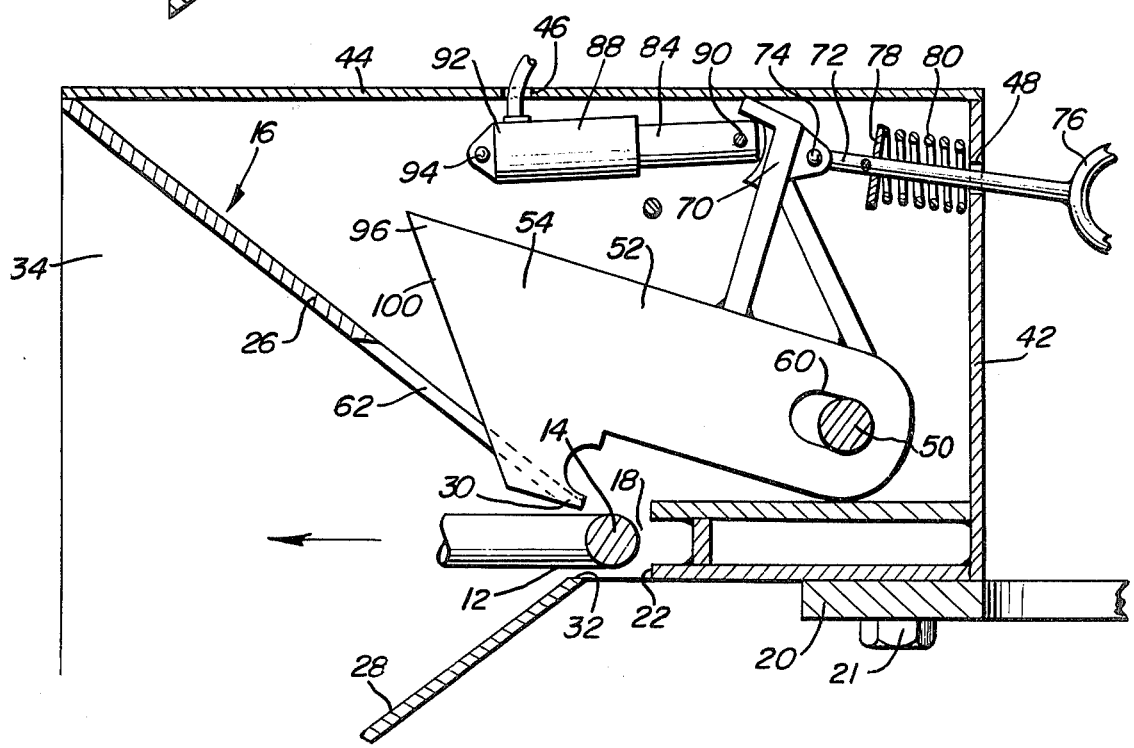
FIG. 4 is a fragmentary vertical sectional view similar to FIG. 3 but with the latching hook of the hitch construction in the inoperative position preparatory to the hitch pole being rearwardly displaced relative to the receiver.

The hydraulic cylinder 88 may be replaced by a solenoid and a pull rope 102, see FIG. 1, may be attached to the pull ring 76 whereby the latch 54 may be shifted from the operative position illustrated in FIG. 3 to the inoperative position illustrated in FIG. 4 by various means from a remote location.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a forwardly projecting hitch pole including a coupling member on its free forward end, a rearwardly opening receiver for said coupling member and for mounting on a towing vehicle, the coupling member including a horizontal forwardly bowed arcuate hitch portion generally cylindrical in cross section, said receiver defining a rearwardly opening horizontally elongated and transversely extending recess in which to receive said hitch portion and including an arcuate rearwardly facing forward seat defining extremity curving rearwardly at its opposite ends toward the ends of said recess, a vertically swingable latch oscillatably supported from said receiver, including a rear forwardly opening hook portion and angularly displaceable relative to said receiver between an operative position with said hook portion horizontally registered with the central portion of the open rear of said recess and an inoperative position with said hook portion vertically displaced out of horizontal registry with said recess, said latch hook portion, when said latch is in said operative position and when said hitch portion is seated in said recess, being disposed immediately rearwardly of said hitch portion, said latch being elongated and extending in a front-to-rear direction relative to said receiver, the forward end portion of said latch including an elongated slot therein, said receiver including a horizontal transverse pivot member slidably and rotatably received in said slot whereby said latch, when in said operative position, may be longitudinally shifted between forward and rearward limit positions defined by the rear and front ends of said slot.

2. The combination of claim 1 wherein the rear of said latch and said receiver include coacting portions preventing shifting of said latch to said inoperative position from said operative position when said latch is in its rearmost limit position.

3. The combination of claim 2 including means operatively connected between said receiver and latch yieldingly biasing said latch toward its operative position and also toward its rearmost limit position.

4. The combination of claim 3 wherein the rear end of said latch and said receiver include coacting cam portions operative to shift said latch from said rearmost position toward said forwardmost position during final movement of said latch from said inoperative position to said operative position.

5. The combination of claim 4 wherein said forwardly opening hook portion defines a semicircular recess for embracingly engaging the rear side of said arcuate hitch portion.

6. The combination of claim 5 including means operatively connected to said latch for shifting the latter from said operative and rearmost position toward said forwardmost position and thereafter to said inoperative position from a location remote from said latch.

7. The combination of claim 6 wherein said receiver includes means defining a forwardly tapering receiver rearward of the rear portion of said recess and which defines cam surfaces disposed about said recess and tapering toward the latter.

8. In combination with a forwardly projecting hitch pole including a coupling member on its free forward end, a rearwardly opening and forwardly tapering receiver for said coupling member and for mounting on a towing vehicle, the coupling member including a horizontal forwardly bowed arcuate hitch portion generally cylindrical in cross section, the forward extremity of said receiver defining a rearwardly facing seat against which said hitch portion may seat a vertically swingable latch oscillatably supported from said receiver, including a rear forwardly opening hook portion and angularly displaceable relative to said receiver between an operative position with said hook portion horizontally registered with and disposed slightly rearward of said seat and an inoperative position with said hook portion vertically displaced out of horizontal registry with said seat, said latch hook portion, when said latch is in said operative position and when said hitch portion is seated in said seat, being disposed immediately rearwardly of said hitch portion, said latch being elongated and extending in a front-to-rear direction relative to said receiver, the forward end portion of said latch including an elongated slot therein, said receiver including a horizontal transverse pivot member slidably and rotatably received in said slot whereby said latch, when in said operative position, may be longitudinally shifted between forward and rearward limit positions defined by the rear and front ends of said slot.

9. The combination of claim 8 wherein the rear of said latch and said receiver include coacting portions preventing shifting of said latch to said inoperative position from said operative position when said latch is in its rearmost limit position, means operatively connected between said receiver and latch yieldingly biasing said latch toward its operative position and also toward its rearmost limit position.

* * * * *